United States Patent [19]

Yoshikawa

[11] 4,296,365

[45] Oct. 20, 1981

[54] METHOD AND APPARATUS FOR CORRECTING ERRORS OF FEEDING OF ENDLESS BELT IN AUTOMATIC SCREEN PRINTING

[75] Inventor: Takaharu Yoshikawa, Takatsuki, Japan

[73] Assignee: Toshin Kogyo Co. Ltd., Hyogo, Japan

[21] Appl. No.: 75,333

[22] Filed: Sep. 13, 1979

[30] Foreign Application Priority Data

Apr. 6, 1979 [JP] Japan .................................. 54-41080

[51] Int. Cl.$^3$ .................................. G05D 23/275

[52] U.S. Cl. .................................. 318/632; 318/162

[58] Field of Search .................... 318/632, 571, 39, 7, 318/6, 162; 101/115

[56] References Cited

U.S. PATENT DOCUMENTS

| | | | |
|---|---|---|---|
| 2,972,269 | 2/1961 | Wallace et al. | 318/6 X |
| 3,515,959 | 6/1970 | Jackson | 318/7 |
| 4,009,113 | 7/1978 | Hayashi | 318/632 |
| 4,137,487 | 1/1979 | Niestroj et al. | 318/39 |

*Primary Examiner*—B. Dobeck
*Attorney, Agent, or Firm*—Sherman & Shalloway

[57] ABSTRACT

In an automatic screen printing machine of the roller intermittent drive type, errors of feeding of an endless belt by a driving roller are effectively eliminated by preliminarily correcting feed errors owing to unevenness of the thickness and elongation of the endless belt by increasing or decreasing the pulse number representing the repeat length of the endless belt and controlling feeding of the endless belt at every repeat based on the increased or decreased pulse number.

14 Claims, 5 Drawing Figures

METHOD AND APPARATUS FOR CORRECTING ERRORS OF FEEDING OF ENDLESS BELT IN AUTOMATIC SCREEN PRINTING

BACKGROUND OF THE INVENTION (1) Field of the Invention

The present invention relates to an automatic screen printing process in which the repeat length of an endless belt is preset as a pulse number and a roller for driving the endless belt is intermittently driven based on this preset pulse number. More particularly, the present invention relates to a method and apparatus for effectively correcting feed errors in the endless belt in this automatic screen printing process.

(2) Description of the Prior Art

In an automatic screen printing machine, an endless belt for intermittently feeding a cloth to be printed, in the state applied thereon, is ordinarily prepared by piling several numbers of fiber layers and rubber layers alternately and compressing the piled layers to form an integrated structure. Accordingly, the endless belt is not rigid, and therefore, it is not uniform in the dimensional precision and mechanical properties.

Accordingly, however high the operation precision of an intermittent feed mechanism may be in the automatic printing machine, errors are inevitably caused in the intermittent feeding owing to the following inherent properties of individual endless belts:

(1) Uneven thickness (thickness difference more than ±0.1 mm per 3.0 mm thickness)

(2) Uneven elongation (elongation difference more than ±0.1% per 0.7% elongation)

Actually, the uneven elongation has worst influences on precise intermittent feeding of an endless belt as well as the uneven thickness.

More specifically, as shown in FIG. 3, an endless belt 3 is intermittently driven by a driving roller 1 arranged in the rear portion of the printing machine, and in this mechanism, it has been confirmed that feed errors are caused by changes of an imaginary driving diameter of the endless belt wound on the periphery of the driving roller (D in FIG. 3; called "pitch circle diameter" or "center face"), that is, changes of the height h from the outer diameter of the driving roller and changes of the quantity of elongation of the front part of the endless belt that is wound on the driving roller.

As means for correcting such feed errors for maintaining a required accuracy in feeding, there has been adopted a method in which, of the entire circumference of the endless belt, a part of a large elongation is back-covered with a cloth having a thickness corresponding to the elongation of said part to ensure a uniform elongation as much as possible. However, this method is defective and disadvantageous in that the operation of back-covering the endless belt is very difficult and troublesome and lives of applied cloths are very short because they are readily peeled or broken. Furthermore, an effect of maintaining a required accuracy in the feeding operation is not complete. Therefore, this method is still insufficient.

As another means for eliminating feed errors, there has been proposed and manufactured a printing machine in which both the selvage ends of an endless belt are clamped as shown in FIG. 4 and a device for clamping the selvage ends is intermittently fed with high precision by a hydraulic cylinder or the like. The printing machine of this type is defective and disadvantageous in that the structures of the clamping device and feed mechanism are much complicated and when the width of the endless belt is large, even if both the selvage ends are precisely fed, the central portion of the belt is delayed by a distance S behind the selvages by the resistance owing to the frictional contact with a printing table and is fed in an arcuate shape as shown in FIG. 4. Accordingly, a required precision cannot be maintained in the central portion of the endless belt. Moreover, uneven forces are imposed on the endless belt to cause deformation and shorten the life of the endless belt.

The applicant has already proposed an automatic screen printing machine of the roller intermittent drive type in which the repeat length of an endless belt is preset as the pulse number, the actual feed length of the endless belt is detected as a pulse number, subtraction of the actually detected number of pulses from the preset pulse number is performed and control of driving is carried out so that an electric motor for driving the roller is stopped at the preset pulse number (see Japanese Patent Application Laid-Open Specification No. 34483/79). In the automatic printing machine of this type, there can be attained an advantage that the repeat length can be preset in a broad range in a non-staged manner very simply by operating switch means, and the automatic printing machine of this type is excellent over the conventional printing machine with respect to the feed precision. However, it is technically difficult to detect the actual feed length of the endless belt precisely as the number of pulses, and this automatic printing machine is still insufficient in the effect of completely eliminating feed errors caused by uneven thickness or uneven elongation of the endless belt per se.

For example, in the case where the actual feed length of the endless belt is detected as the number of pulses by a measuring roll falling in contact with the endless belt and a pulse generator coupled with the measuring roll to generate pulses in a number corresponding to the displacement of the measuring roll, precise detection of the feed length is difficult because of deformation of the endless belt per se or slips caused between the endless belt and measuring roll. When the pulse generator is directly connected to an endless belt-driving roller free of such slips or a driving direct current electric motor, it is also difficult to detect the actual feed length of the endless belt precisely because of changes of the above-mentioned pitch circle diameter or changes of the elongation quantity in the endless belt.

SUMMARY OF THE INVENTION

The applicant made researches with a view to eliminating the above-mentioned defect involved in the previously proposed automatic printing machine, and found that feed errors of an endless belt owing to uneven thickness or elongation of the belt per se are peculiar to individual positions of the belt per se and they are hardly changed with lapse of time, and that at every circular movement of the endless belt, the same error is caused at the same position and therefore, in presetting the repeat length of the endless belt as the pulse number and intermittently driving the roller based on this preset pulse number, if such feed errors at individual positions of the belt are compensated and corrected by increasing or decreasing the pulse number, the precision of feeding can be remarkably improved.

It is a primary object of the present invention to provide an automatic screen printing machine of the roller intermittent drive type in which the precision of feeding of an endless belt at every repeat is remarkably improved.

Another object of the present invention is to provide an automatic screen printing process and apparatus in which even when an endless belt which is not uniform in the thickness or elongation at individual positions, feed errors can be corrected precisely at every repeat.

Still another object of the present invention is to provide an automatic screen printing process and apparatus in which when feed errors of one endless belt are once measured and they are preliminarily corrected by decreasing or increasing the pulse number, even if the feed length is changed afterward, a high precision can be maintained in the feed speed.

A further object of the present invention is to provide an automatic screen printing process and apparatus in which the feed length of an endless belt can be precisely controlled while eliminating the abovementioned disadvantages involved in detecting the actual feed length of the endless belt as the number of pulses.

In accordance with one fundamental aspect of the present invention, there is provided a method for correcting feed errors in the automatic screen printing process comprising presetting the repeat length of an endless belt as a pulse number and intermittently driving an endless belt-driving roller based on the preset pulse number, said method being characterized in that feed errors owing to unevenness of the thickness and elongation at individual positions of the endless belt are preliminarily corrected by increasing or decreasing the pulse number and feeding of the endless belt at every repeat is controlled based on said increased or decreased pulse number.

In accordance with another fundamental aspect of the present invention, there is provided an apparatus for intermittently driving an endless belt in an automatic screen printing machine comprising a direct current electric motor for intermittently driving an endless belt-supporting roller, switch means for converting the repeat length of the endless belt to pulses and thus presetting the repeat length as a pulse number, a repeat length-detecting mechanism for detecting the length of feeding of the endless belt by said roller as a pulse number, a digital control mechanism subtracting the detected pulse number from the preset pulse number and generating a speed-reducing signal for stopping the direct current electric motor at the preset pulse number and an electric motor control mechanism for controlling the input to the direct current electric motor based on the speed-reducing signal from the digital control mechanism to reduce the speed of the direct current electric motor and stop the direct current electric motor, said intermittently driving apparatus comprising correcting switch means adapted to preliminarily correct feed errors owing to unevenness of the thickness and elongation at individual positions of the endless belt by increasing or decreasing the pulse number.

DETAILED DESCRIPTION OF THE PREFERRED EMBODIMENTS

The present invention will now be described in detail by reference to embodiments illustrated in the accompanying drawing.

Figure 1:
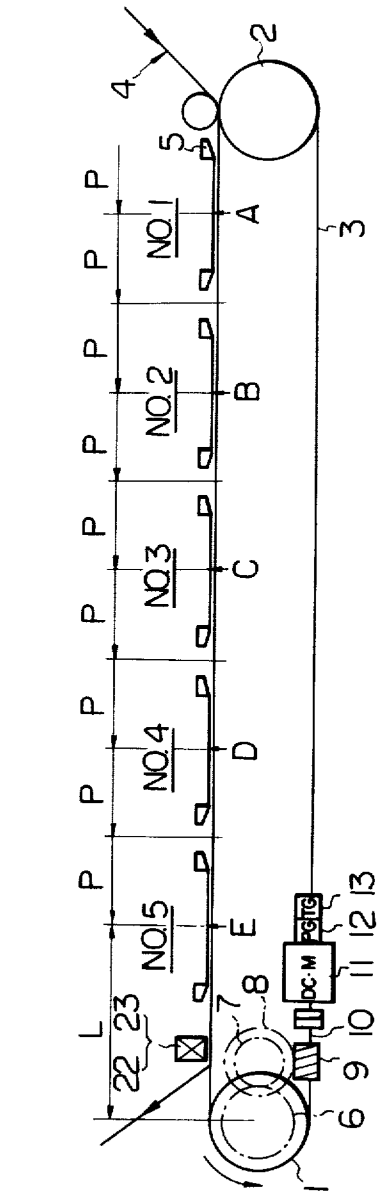
FIG. 1 is a side view illustrating diagrammatically arrangement of an automatic screen printing machine according to the present invention.

Referring to FIG. 1, a driving roller 1 and a driven roller 2 are mounted on both the ends of a machine frame (not shown), that is, a printing operation zone, and an endless belt 3 is stretched between the driving roller 1 and driven roller 2. A material 4 to be printed is applied onto the endless belt 3 on the side of the driven roller 2, and is fed into the printing operation zone intermittently by one repeat length at one time.

One or more screen frames 5 are located above the endless belt 3 in the printing operation zone. As means for moving these screen frames 5 relatively in the vertical direction, there are disposed a vertical movement frame (not shown) having a known structure and a driving mechanism (not shown) for moving the vertical movement frame in the vertical direction. While the endless belt 3 performs the feeding operation, the screen frames 5 are located at the relatively elevated position, and when the endless belt 3 is not driven, one screen frame 5 is brought down by the driving mechanism to cause a screen 5A to fall in contact with the material 4. Thus, a printing paste on the screen is applied onto the material 4 by a known squeegee device (not shown). After this squeegee operation, the screen frame 5 is relatively elevated and returned to the above-mentioned elevated position. In this state, the endless belt 3 is fed by one repeat length by the driving roller, and the foregoing operations are repeated.

In the present invention, in order to intermittently feed the endless belt without feed errors irrespectively of unevenness of the thickness and elongation at individual positions of the endless belt 3, a direct current electric motor 11, a switch 16 for converting the repeat length to pulses and presetting the repeat length as a pulse number, switches 18 and 20 for preliminarily correcting feed errors by increasing or decreasing the pulse number, a repeat length detecting mechanism 12 for detecting the length of feeding by the roller as a pulse number, a digital control mechanism 15 and an electric motor control mechanism 14 for controlling the electric input to the electric motor 11 are diposed and arranged so that the positional relationship described in detail hereinafter is established among these members.

In order to drive the endless belt 3 strictly according to an electrically controlled program, it is important to use the direct current electric motor 11. Rotation of a driving shaft 10 of the direct current electric motor 11 is is transmitted to the driving roller 1 through a worm 9 fixed to the rotation shaft 10, a worm gear 8 engaged with the worm 9, a spur gear 7 pivoted on the worm gear 8 and a spur gear 6 pivoted on the driving roller 1 and engaged with the spur gear 7, and the endless belt 3 is driven by the driving roller 1.

The repeat length-presetting switch 16 is mounted on an operation panel of the digital control mechanism 15, and the repeat length of the endless belt 3 is set to a desirable value as a pulse number.

The repeat length-detecting mechanism for detecting the actual feed length of the endless belt 3 comprises a pulse generator 12 connected directly to the driving shaft 10 of the electric motor 11. This pulse generator 12 is capable of generating signals of a predetermined pulse number precisely in correspondence to the displacement angle of a rotation shaft thereof connected to the driving shaft 10. Of course, the displacement of the driving shaft 10 of the electric motor 11 is not exactly in agreement with the actual feed length of the endless belt 3 for the reasons described hereinbefore. According to the present invention, feed errors can be precisely corrected by preliminarily increasing or decreasing the pulse number depending on inherent feed errors at individual positions of the endless belt 3 by the correcting switch 18 or 20.

Pulse signals from the pulse generator 12 are transmitted to the digital control mechanism 15 through a line 12A. Such pulse signal is displayed as an actual feed length on a digital display tube 17 mounted on an operation panel of the digital control mechanism 15.

In the digital control mechanism 15, subtraction is conducted between the preset pulse number set by the switch 16 and a correction pulse number obtained by increasing or decreasing the pulse number detected by the pulse generator 12 by the pulse number set by the correcting switch 18 or 20, and a speed reduction signal is generated so as to stop the direct current electric motor 11 at the finally set pulse number.

The electric motor control mechanism 14 ordinarily comprises a thyristor panel, and a speed reduction signal from the digital control mechanism 15 is supplied as an SCR gate signal to the thyristor panel 14 through a line 15A. An electric input applied from a power source 26 to the direct current electric motor 11 through the thyristor panel 14 and line 14A is controlled based on the abovementioned SCR gate signal (speed reduction signal) to reduce the velocity of the electric motor 11 and stop the electric motor 11 at the finally set pulse number.

The feed stroke of the belt 3 comprises an acceleration driving step, a constant speed driving step and a speed reduction-stopping step, and the stoppage period follows this feed stroke and both such feed stroke and stoppage period constitute one cycle of the printing operation.

The feed length L (m) of the belt is represented by the following formula:

$$L = V\left(t + \frac{\Delta t_1}{2} + \frac{\Delta t_2}{2}\right) \qquad (1)$$

wherein $\Delta t_1$ stands for the time (sec) of the acceleration driving step, t stands for the time (sec) of the constant speed driving step, $\Delta t_2$ stands for the time (sec) of the speed reduction-stopping step, and V stands for the velocity (m/sec) of the belt at the constant speed driving step.

In the foregoing formula (1), values of V, $\Delta t_1$ and $\Delta t_2$ are determined by the mechanical structure of the printing apparatus and the capacity of the direct current electric motor 11.

In the present invention, the digital control mechanism 15 and the electric motor control mechanism (thyristor panel) 14 are arranged so that the endless belt 3, that is, the direct current electric motor 11, is driven according to the diagram represented by the formula (1). A tachometer 13 for detecting the actual rotation speed of the direct current electric motor 11 as a voltage is connected to the driving shaft 10 of the direct current electric motor 11, and a detection signal from the tachometer 13 is fed to a digital regulator 15 through a line 13A and fed back to the electric motor control mechanism 14 through the line 13A. When the repeat length is set as a pulse number by the switch 16, in the digital control mechanism 15, pulse numbers corresponding to the respective operation times $\Delta t_1$, t and $\Delta t_2$, namely $N\Delta t_1$, Nt and N $t_2$ in which N designates the pulse number per unit time (Hz/sec), are set.

Ordinarly, it is preferred that the time $\Delta t_1$ of the acceleration driving step be equal to the time $\Delta t_2$ of the speed reduction-stopping step.

In the automatic screen printing machine of the roller intermittent drive type, even if the driving roller 1 is rotated precisely by a rotation angle ($\theta$ in FIG. 3) corresponding to the feed length P at every repeat movement because of unevenness of the thickness and elongation in the endless belt, the feed length at every repeat movement is not correct. For example, in the embodiment shown in FIG. 1, a pattern A printed by a screen No. 1 is not completely registered with a pattern B printed by a screen No. 2, a pattern C printed by a screen No. 3, a pattern D printed by a screen No. 4 or a pattern E printed by a screen No. 5. Accordingly, it is very difficult to attain a required pattern matching precision.

As pointed out hereinbefore, such matching errors are due mainly to unevenness of the elongation in the endless belt, and it was found that in one endless belt (having a circumferential length of 40 to 70 m), parts of a high elongation and parts of a low elongation are always fixed and not changed at all.

In the present invention, with respect to each of endless belts to be used, unevenness of the elongation, that is, the uneven feeding, is determined and parts of a higher or lower elongation are precisely grasped, and deviations of the elongation are preliminarily corrected by setting a pulse number for increase or decrease by the switch 18 or 20. Determination of feed errors and setting of pulse numbers for increase or decrease for correction are performed according to the following procedures.

(1) A series of position numbers 1, 2, 3, . . . N are marked on the top face of the belt at intervals corresponding to the feed length P or at optional intervals (for example, 1 m).

(2) In the embodiment shown in FIG. 1, none of screens 5 are mounted but a ruler is fixed to a position corresponding to the central position A of the screen No. 1 and a fine marking line is drawn on the top face of the belt at every repeat feeding of the belt.

(3) A measuring device including a scale and a magnifying glass is fixed to a position corresponding to the central position E of the final screen No. 5 to read the marking line.

(4) The marking lines drawn on the belt surface at every repeat movement at the position corresponding to the central portion A of the screen No. 1 are sequentially fed by the distance P at one time and they finally arrive at the position corresponding to the portion E of the screen No. 5. The stop position of each marking line is read by the scale and recorded.

Figure 5:
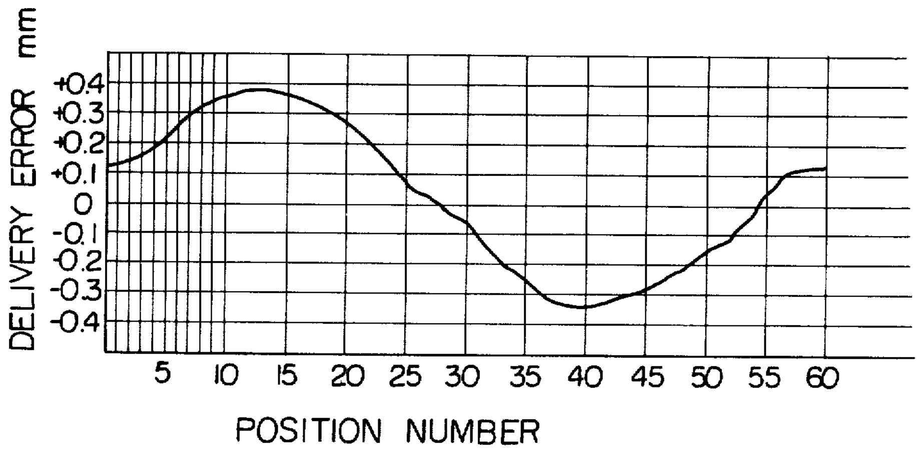
FIG. 5 is a curve illustrating the relation between positions of an endless belt in the automatic screen printing machine and feed errors.

(5) Errors at respective stop positions on one circle of the endless belt, that is, feed errors, are plotted to form a graph of FIG. 5. In this graph, the abscissa indicates a series of position numbers marked at intervals of the feed length P or optional equal intervals, and the ordinate indicates the quantities of feed errors.

(6) When a part of a lower elongation is hung on the driving roller, the feed quantity is increased and the curve is on the plus side, and when a part of a higher elongation is hung on the driving roller, the feed quantity is decreased and the curve is on the minus side. Accordingly, error quantities, that is, degrees of the elongation, at respective positions of the belt can be seen from the graph.

(7) The curve shown in FIG. 5 is hardly changed with lapse of time with respect to the same endless belt, and even if the measurement is repeated while travelling the endless belt by many cycles, the curve illustrating the relation between the positions of the belt and the error quantities is not changed at all.

In many printing endless belts, one peak on the plus side and one trough on the minus side appear in this error curve. The height and position of each of such peak and trough are not substantially changed even if the belt is used repeatedly for the printing operation.

(8) After the inherent properties of the endless belt have been thus determined, the detected pulse number is increased on plus portions to increase the feed quantity and the detected pulse number is decreased on minus portions to decrease the feed quantity, whereby the feed errors are controlled within an allowable range.

In case of an endless belt having an error curve shown in FIG. 5, the height of the peak on the plus side is 0.38 mm and the depth of the trough on the minus side is 0.34 mm, and the total error is 0.72 mm. Supposing that an allowable error is within a range of $\pm 0.2$ mm, that is, 0.4 mm as a whole, in portions of the position numbers 5 through 22 the errors exceed the upper limit of $+0.2$ mm and in portions of the position numbers 33 through 48 the errors are below the lower limit of $-0.2$ mm.

Accordingly, when the portions of the position numbers 5 through 22 of the belt pass through the standard position of the screen printing unit, for example, the position E in FIG. 1, the detected pulse number is decreased, and when the portions of the position numbers 33 through 48 pass through the standard position, the detected pulse number is increased, whereby it is made possible to control the feed error at every repeat feeding within the allowable range.

Figures 2, 3:
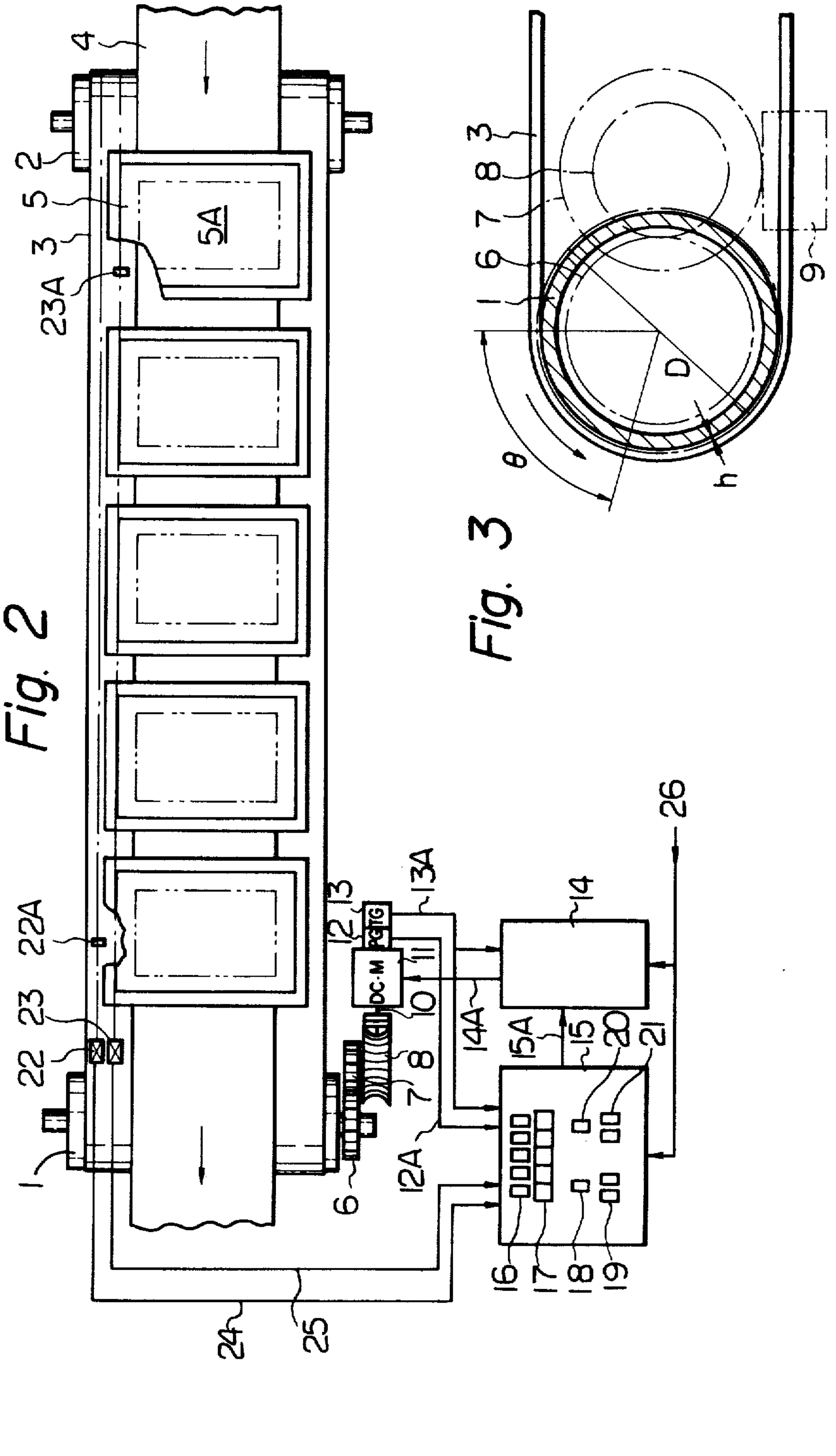
FIG. 2 is a plan view showing the automatic screen printing machine shown in FIG. 1.
FIG. 3 is a diagram illustrating the imaginary driving diameter, i.e., pitch circle diameter, of an endless belt in the automatic screen printing machine.
Figure 4:
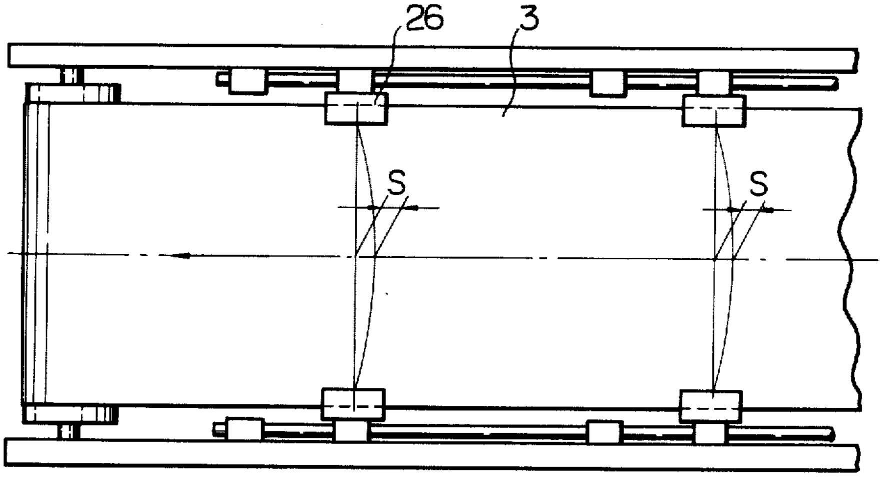
FIG. 4 is a diagram illustrating errors in feeding of an endless belt by clamp means.

In the embodiment illustrated in FIGS. 1 and 2, the switch 18 is a correcting switch for decreasing the pulse number and the switch 20 is a correcting switch for increasing the pulse number, and these switches 18 and 20 are arranged so that the pulse number can be increased or decreased by 9 pulses at maximum for each repeat length. A digital switch 19 for setting a decrease frequency of 2 columns is disposed below the switch 18 and a digital switch 21 for setting an increase frequency of 2 columns is disposed below the switch 20, so that it is set how many times the increase or decrease of the pulse number set by the switch 18 or 20 should be repeated in succession.

In the present invention, positions of the endless belt for increasing or decreasing the pulse number can be set by optional methods. For example, a storing device is disposed in the digital control mechanism 15, and idle travelling of the endless belt 3 is performed so that the pulse numbers to be increased or decreased for correction of feed errors and the corresponding positions of the belt are stored in the storing device (this storing operation may be performed simultaneously with the abovementioned idle travelling performed for determining the feed errors). Thus, correction of the feed errors by increasing or decreasing the pulse number can be performed completely automatically.

There may also be adopted a method in which marks indicating increase or decrease of the pulse number are attached to positions of the endless belt where the feed error exceeds the allowable range, the marks are detected by an optical-electric detection system and correction is performed by increasing or decreasing the pulse number by a predetermined pulse number. This method is advantageous because any particular storing device need not be disposed and correction of feed errors by increasing or decreasing the pulse number can be performed completely automatically.

In the embodiment specifically disclosed in the accompanying drawing, a mark 22A indicating decrease of the pulse number is formed at a position corresponding to the peak shown in FIG. 5 (the position No. 5 of the belt) on the endless belt in an area separate from the material 4 to be printed, and a mark 23A is formed at a position corresponding to the trough shown in FIG. 5 (the position No. 33 of the belt). Photo-electric detectors 22 and 23 are arranged above the endless belt so as to detect the marks 22A and 23A, respectively. A pulse number-decreasing signal from the photo-electric detector 22 is fed into the digital control mechanism 15 through a line 24 and a pulse number-increasing signal from the photo-electric detector 23 is fed into the digital control mechanism 15 through a line 25.

In the present invention, the endless belt is driven and controlled according to the following procedures.

[I] When Feed Errors Are Not Corrected:

(i) On receipt of the signal indicating the start of the screen printing machine, the digital control mechanism 15 emits an acceleration signal to the electric motor control mechanism 14 and an acceleration current is supplied to the direct current electric motor 11 based on this signal. Accordingly, the endless belt 3 is driven and accelerated according to the program represented by the formula (1).

(ii) The digital control mechanism 15 counts the pulse number $\Delta t_1 N$ and/or confirms from the detection signal from the tachometer 13 that the rotation speed of the electric motor 11 arrives at a level corresponding to the velocity V of the constant speed driving of the belt. At this point, the digital control mechanism 15 emits a constant speed driving signal to the electric motor control mechanism 14, and on receipt of this signal, the electric motor control mechanism 14 supplies a constant speed driving electric current to the direct current electric motor 11 to drive at a constant speed the direct current electric motor 11, namely the endless belt 3, according to the program represented by the formula (1).

(iii) The digital control mechanism 15 performs subtraction between the pulse number ($N_S$) set by the switch 16 and the pulse number ($N_D$) detected by the feed length-detecting mechanism 12, and when the difference ($N_S - N_D$) corresponds to the value represented by the following formula:

$$N_S - N_D = \Delta t_2 N \quad (2)$$

in which $N_S$ is equal to $N\Delta t_1 + Nt + N\Delta t_2$, the digital control mechanism 15 emits a speed reduction signal to the electric motor control mechanism 14. On receipt of this signal, the electric motor control mechanism 14 supplies a speed reduction electric current to the direct current electric motor 11. Accordingly, the speed of the electric motor 11, namely the endless belt 3, is reduced according to the program represented by the formula (1) and the electric motor 11 is stopped to stop the endless belt 3. Speed reduction and stopping of the direct current electric motor 11 are performed by reference to the detected pulse signal from the feed length detecting mechanism 12 and the voltage signal from the tachometer 13 so that the endless belt 3 is stopped precisely at the repeat length corresponding to the set pulse number. The speed reduction current may be supplied in the form of so-called electric brake to the electric motor 11.

[II] When Feed Errors Are Corrected:

When the photo-electric detector 22 or 23 detects the mark 22A or 23A, the detector 22 or 23 emits a detection signal for increase or decrease the pulse number to the digital control mechanism 15. On receipt of this detection signal, the digital control mechanism 15 increases or decreases the detected pulse number ($N_D$) detected by the pulse generator 12 by the correction pulse number ($N_C$) set by the switch 18 or 20. Subtraction is made between the preset pulse number ($N_S$) and the increased or decreased detected pulse number ($N_D + N_C$) and when the difference becomes equal to the value represented by the following formula:

$$N_S - (N_D + N_C) = \Delta t_2 N \quad (3)$$

a speed reduction signal is emitted to the electric motor control mechanism 14. Operations other than those described above are conducted in the same manner as described above with respect to the case where feed errors are not corrected.

When the frequency of increase or decrease is set by the switch 19 or 21 for setting the decrease or increase frequency, the foregoing operations are repeated at the frequency set by the switch 19 or 21.

According to the present invention, by virtue of the foregoing structure, the precision of feeding of the endless belt can be maintained at a very high level irrespectively of unevenness of the thickness or elongation of the endless belt per se. From results of actual experiments, it was confirmed that when pulses are generated from the pulse generator at a rate of 1 pulse per 0.02 mm of the feed error, errors of feeding of the endless belt can be controlled within the allowable range by increasing or decreasing the pulse number by several pulses at most. In many cases, good results are obtained if increase or decrease of the pulse number is performed only once. However, if this correction is carried out dividely several times, that is, if increase or decrease of the pulse number is conducted repeatedly a plurality of times, the feeding precision can be further improved.

In the present invention, it is preferred that correction by increase or decrease of the pulse number be conducted on the detected pulse number ($N_D$) as in the foregoing embodiment. However, similar results can be obtained also when this correction is conducted on the preset pulse number ($N_S$).

As will be apparent from the foregoing illustration, according to the present invention, by appropriately increasing or decreasing the repeat length depending on inherent properties of the endless belt, the precision of feeding of the endless belt can be remarkably improved and a printed product having a high matching or registering effect can be obtained. Furthermore, increase or decrease of the repeat length is appropriately performed depending on the state of the endless belt, and even if the state is changed to some extent while the endless belt is used repeatedly for a long time, this change can easily be coped with only by changing a set value in any of the digital switches.

What is claimed is:

1. In an automatic screen printing process comprising the steps of presetting the repeat length of an endless belt as a pulse number and intermittently driving an endless belt-driving roller based on the preset pulse number, a method for correcting feed errors including the steps of correcting feed errors owing to unevenness of thickness and elongation at individual positions of the endless belt by increasing or decreasing the pulse number prior to printing and feeding of the endless belt at every repetition for printing under control of said increased or decreased pulse number.

2. A feed error correcting method according to claim 1 wherein the repeat length is preset as a pulse number, further comprising the steps of detecting feeding of the endless belt by a roller as a pulse number, increasing or decreasing the detected pulse number for correction by a pulse number corresponding to the feed error, and subtracting the increased or decreased detected pulse number from said preset pulse number, thereby to reduce the speed of the endless belt-driving roller and stop said roller at the preset pulse number.

3. A feed error correcting method according to claim 1 wherein marks indicating decrease and increase of the pulse number are attached to positions of the endless belt where the feed error is on the pulse side and positions of the endless belt where the feed error is on the minus side, respectively, further comprising the step of increasing or decreasing the pulse number in response to a pulse number increasing or decreasing signal from an optical-electric detection system detecting said marks attached to the endless belt.

4. In an automatic screen printing machine comprising a direct current electric motor for intermittently driving an endless belt-driving roller, switch means for converting the repeat length of the endless belt to pulses and thus presetting the repeat length as a pulse number, a repeat length-detecting mechanism for detecting the length of feeding of the endless belt by said roller as a pulse number, a digital control mechanism subtracting the detected pulse number from the preset pulse number and generating a speed-reducing signal for stopping the direct current electric motor at the preset pulse number and an electric motor control mechanism for controlling the input to the direct current electric motor based on the speed-reducing signal from the digital control mechanism to reduce the speed of the direct current electric motor and stop the direct current electric motor, an apparatus for intermittently driving an endless belt which comprises correcting switch means adapted to preliminarily correct feed errors owing to unevenness of the thickness and elongation at individual positions of the endless belt by increasing or decreasing the pulse number prior to printing.

5. An apparatus as set forth in claim 4 wherein said digital control mechanism is co-operatively coupled with said correcting switch means so that the correction pulse number set by said correcting switch means is subtracted from or added to the pulse number detected by the repeat length detecting mechanism.

6. An apparatus as set forth in claim 5 wherein marks indicating decrease of the pulse number and marks indicating increase of the pulse number are attached to positions of the endless belt where the feed error is on the plus side and positions of the endless belt where the feed error is on the minus side, respectively, a detecting mechanism is disposed to detect said marks and emit a pulse number increasing or decreasing signal according to the detected marks, and said digital control mechanism is co-operatively coupled with said detecting mechanism so that on receipt of the pulse number increasing or decreasing signal, the digital control mechanism subtracts the correction pulse number from the detected pulse number or adds the correction pulse number to the detected pulse number.

7. Apparatus for correcting feed errors of an intermittently driven endless belt caused by deformation, uneven thickness or elongation thereof, or by slippage between said belt and a belt displacement measurement apparatus, comprising:

(a) storage means for storing a pulse number representative of a repeat drive length of said belt;

(b) driving means for driving said belt;

(c) first pulse generating means responsive to displacement of a drive shaft of said driving means for generating a first pulse signal representing rotation of said driving means and displacement of said belt;

(d) subtracting means for providing a signal representative of the difference between said repeat drive length and said displacement of said belt;

(e) means for precise stoppage of said belt at a plurality of predetermined positions, comprising (i) correcting means for correcting a discrepency between actual displacement of said belt and displacement indicated by said first pulse signal, including (ii) second pulse generating means generating a correction pulse signal indicative of said discrepency, and (iii) altering means for altering the output of said subtracting means by the amount of said correction pulse signal.

8. The apparatus recited in claim 7 wherein said altering means comprises means for adding said correction signal to said first pulse signal.

9. The apparatus recited in claim 7 wherein said altering means comprises means for subtracting said correction signal from said pulse number representative of a repeat driving length.

10. The apparatus recited in claim 7 wherein said driving means comprises motor means having an output drive shaft, a worm affixed to said drive shaft, a worm gear driven by said worm, and a driving roller driven by a geared member associated with said worm gear.

11. The apparatus recited in claim 7 wherein said means for precise stoppage further comprises means for periodically activating said second pulse generating means and said altering means whereby said feed errors are periodically corrected.

12. The apparatus recited in claim 1 wherein said means for periodically activating comprises means for detection of indicia provided on said endless belt and for activation of said second pulse generating means and said altering means.

13. The method recited in claim 2 further comprising a preliminary step of measuring feed error comprising deviation between actual displacement of individual points on said belt and the displacement of said points detected by said roller.

14. The machine recited in claim 4 wherein said electric motor control mechanism comprises a thyristor panel responsive to a gate signal.

* * * * *